(12) United States Patent
Gano et al.

(10) Patent No.: US 8,981,957 B2
(45) Date of Patent: Mar. 17, 2015

(54) METHOD AND APPARATUS FOR REMOTELY CONTROLLING DOWNHOLE TOOLS USING UNTETHERED MOBILE DEVICES

(75) Inventors: John C. Gano, Carrollton, TX (US); Luke W. Holderman, Plano, TX (US); Michael Fripp, Carrollton, TX (US); Jean Marc Lopez, Plano, TX (US); Floyd R. Simonds, Jersey Village, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/811,650

(22) PCT Filed: Feb. 13, 2012

(86) PCT No.: PCT/US2012/024811
§ 371 (c)(1),
(2), (4) Date: May 3, 2013

(87) PCT Pub. No.: WO2013/122560
PCT Pub. Date: Aug. 22, 2013

(65) Prior Publication Data
US 2013/0222148 A1    Aug. 29, 2013

(51) Int. Cl.
*G01V 3/00* (2006.01)
*E21B 47/14* (2006.01)
(Continued)

(52) U.S. Cl.
CPC . *G01V 3/34* (2013.01); *G01V 11/00* (2013.01)
USPC .......... 340/853.3; 340/854.3; 367/81

(58) Field of Classification Search
CPC ......... E21B 21/08; E21B 47/00; E21B 47/01; E21B 47/12; E21B 47/122; E21B 47/124; G01V 11/002; G01V 3/18; G01V 3/20; G01V 3/22; G01V 3/24

USPC .......... 340/853.2, 853.3, 853.4, 853.5, 854.3, 340/854.8, 856.2; 367/81, 82, 83, 84, 85
See application file for complete search history.

(56) References Cited

U.S. PATENT DOCUMENTS 4,805,407 A    2/1989    Buchanan
5,202,194 A    4/1993    VanBerg, Jr.
(Continued)

FOREIGN PATENT DOCUMENTS

EP    1070573    1/2001

OTHER PUBLICATIONS

Fripp, Michael et al.; Development of a High-Temperature Rechargeable Battery for Downhole Use in the Petroleum Industry; Offshore Technology Conference 19621; May 2008; Houston, Texas.
(Continued)

*Primary Examiner* — Hai Phan
*Assistant Examiner* — Franklin Balseca
(74) *Attorney, Agent, or Firm* — Haynes and Boone, LLP

(57) ABSTRACT

Remote operation of downhole tools in a subterranean wellbore is performed by inserting untethered, mobile devices sequentially into the wellbore. The mobile devices can include motive means, power supply, communication and data storage means, etc. In one embodiment, the method comprises maneuvering a first mobile device into proximity with a downhole tool, the device powering the tool. The first device is then removed, such as by flowing up or dissolving. The now-powered tool is used to perform a test or other operation. A second mobile device is maneuvered into proximity with the downhole tool and data is transferred. The second device is retrieved with the data or, using on-board logic devices, provides "if-then" commands to the downhole tool. Alternately, a third mobile device can be used to power and transfer commands to the tool. The method can be used for various tasks, such as opening bypass ports on ICD valves.

3 Claims, 8 Drawing Sheets

(51) Int. Cl.
*G01V 1/40* (2006.01)
*G01V 3/34* (2006.01)
*G01V 11/00* (2006.01)

(56) References Cited

U.S. PATENT DOCUMENTS

| | | | |
|---|---|---|---|
| 5,207,274 A | 5/1993 | Streich et al. | |
| 5,341,883 A | 8/1994 | Ringgenberg | |
| 6,098,020 A | 8/2000 | den Boer | |
| 6,253,847 B1 | 7/2001 | Stephenson | |
| 6,397,950 B1 | 6/2002 | Streich et al. | |
| 6,426,917 B1 | 7/2002 | Tabanou et al. | |
| 6,443,228 B1 * | 9/2002 | Aronstam et al. | 166/250.11 |
| 6,540,263 B1 | 4/2003 | Sausner | |
| 6,544,691 B1 | 4/2003 | Guidotti | |
| 6,575,248 B2 | 6/2003 | Zhang et al. | |
| 6,672,382 B2 | 1/2004 | Schultz et al. | |
| 6,705,085 B1 | 3/2004 | Braithwaite et al. | |
| 6,723,189 B2 | 4/2004 | Lin et al. | |
| 6,915,848 B2 * | 7/2005 | Thomeer et al. | 166/250.11 |
| 7,168,494 B2 | 1/2007 | Starr et al. | |
| 7,199,480 B2 | 4/2007 | Fripp et al. | |
| 7,258,169 B2 | 8/2007 | Fripp et al. | |
| 7,322,416 B2 | 1/2008 | Burris et al. | |
| 7,363,967 B2 | 4/2008 | Burris et al. | |
| 7,699,102 B2 | 4/2010 | Storm et al. | |
| 7,857,061 B2 | 12/2010 | Richards | |
| 7,879,508 B2 | 2/2011 | Miyano et al. | |
| 8,322,426 B2 | 12/2012 | Wright et al. | |
| 2004/0221986 A1 | 11/2004 | Hosie et al. | |
| 2004/0257241 A1 * | 12/2004 | Menger | 340/854.3 |
| 2009/0151925 A1 | 6/2009 | Richards | |
| 2010/0219646 A1 | 9/2010 | Hay | |
| 2011/0056692 A1 | 3/2011 | Lopez De Cardenas et al. | |
| 2011/0073326 A1 | 3/2011 | Clemens | |
| 2011/0247833 A1 | 10/2011 | Todd | |
| 2012/0006553 A1 | 1/2012 | Korkmaz | |

OTHER PUBLICATIONS

International Search Report and Written Opinion of the International Searching Authority for International Application No. PCT/US2012/024811 dated Oct. 16, 2012.

\* cited by examiner

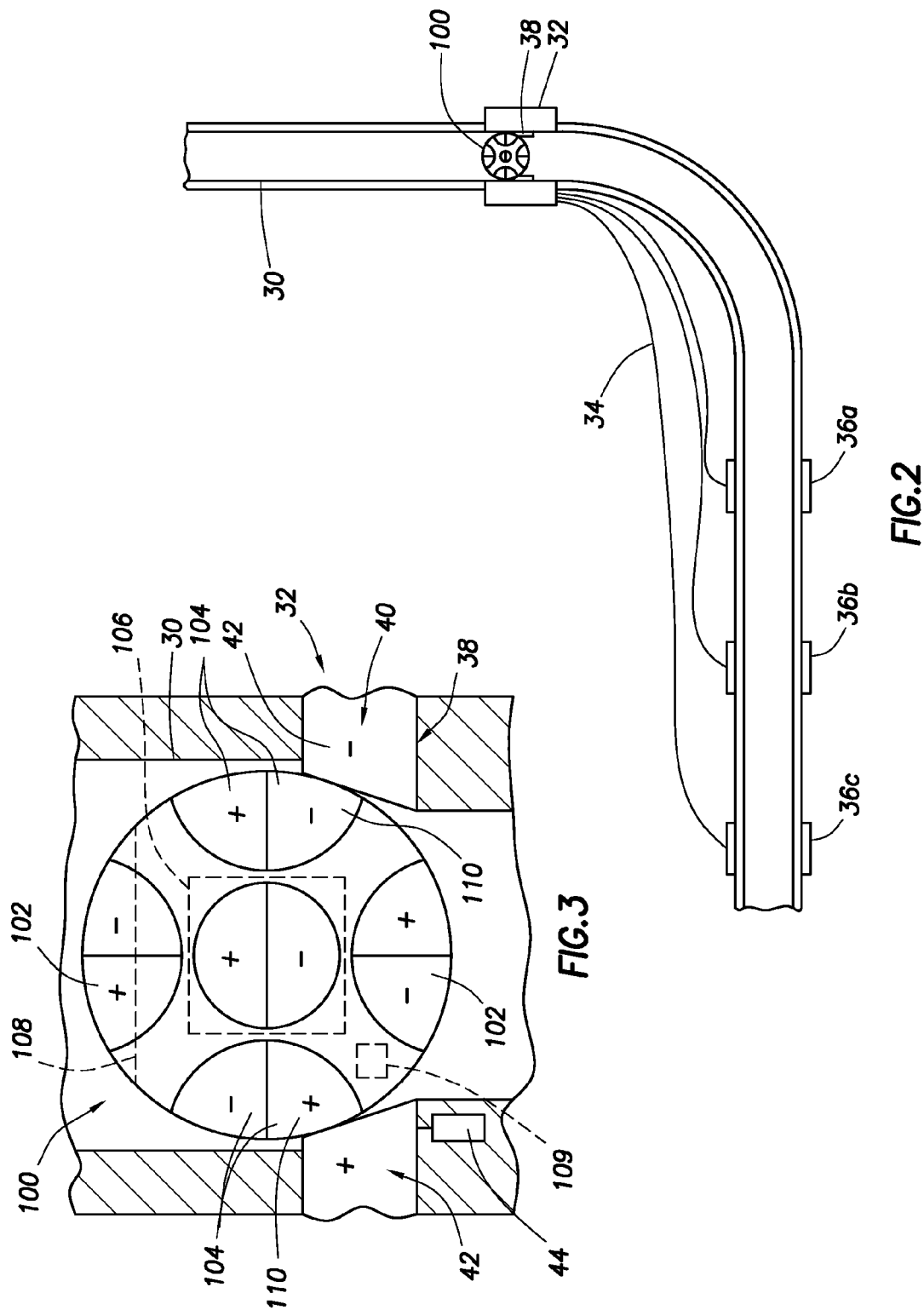

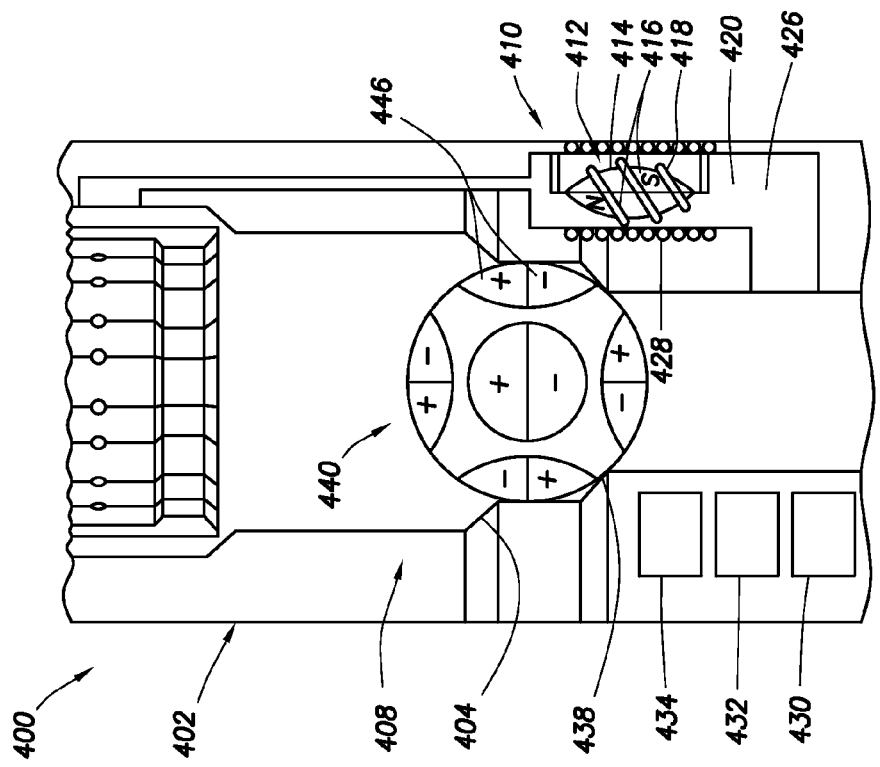
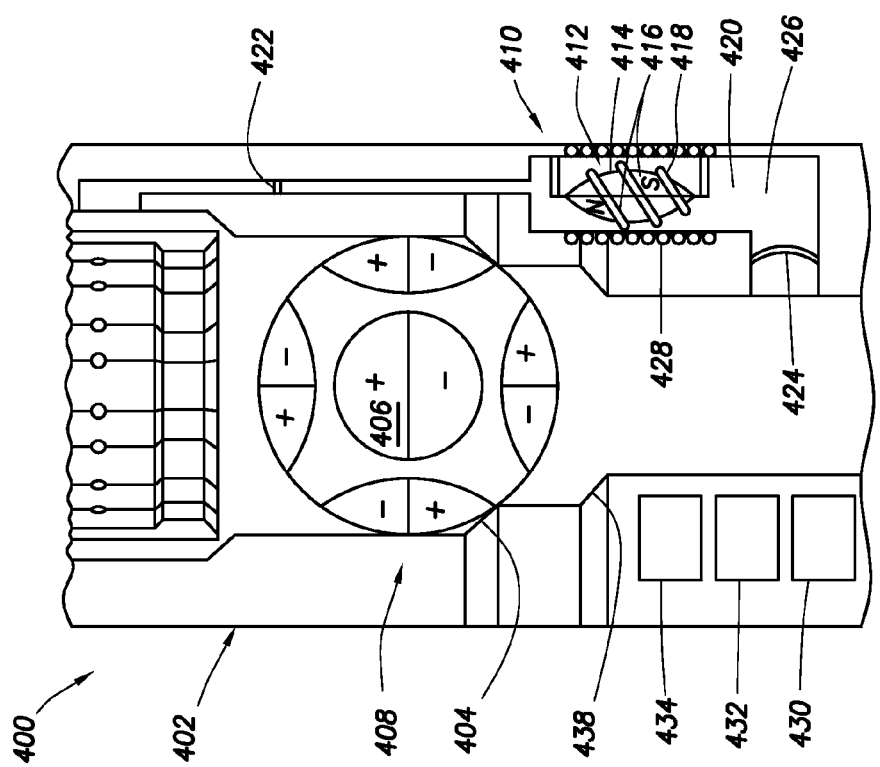

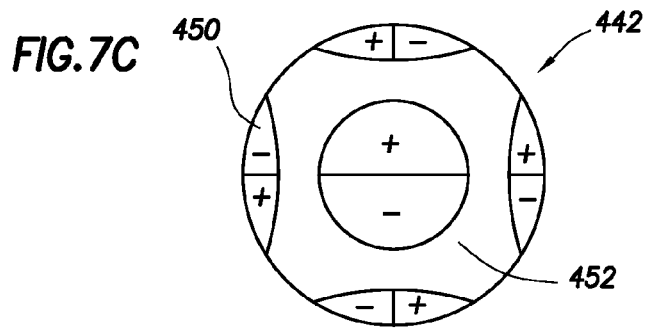
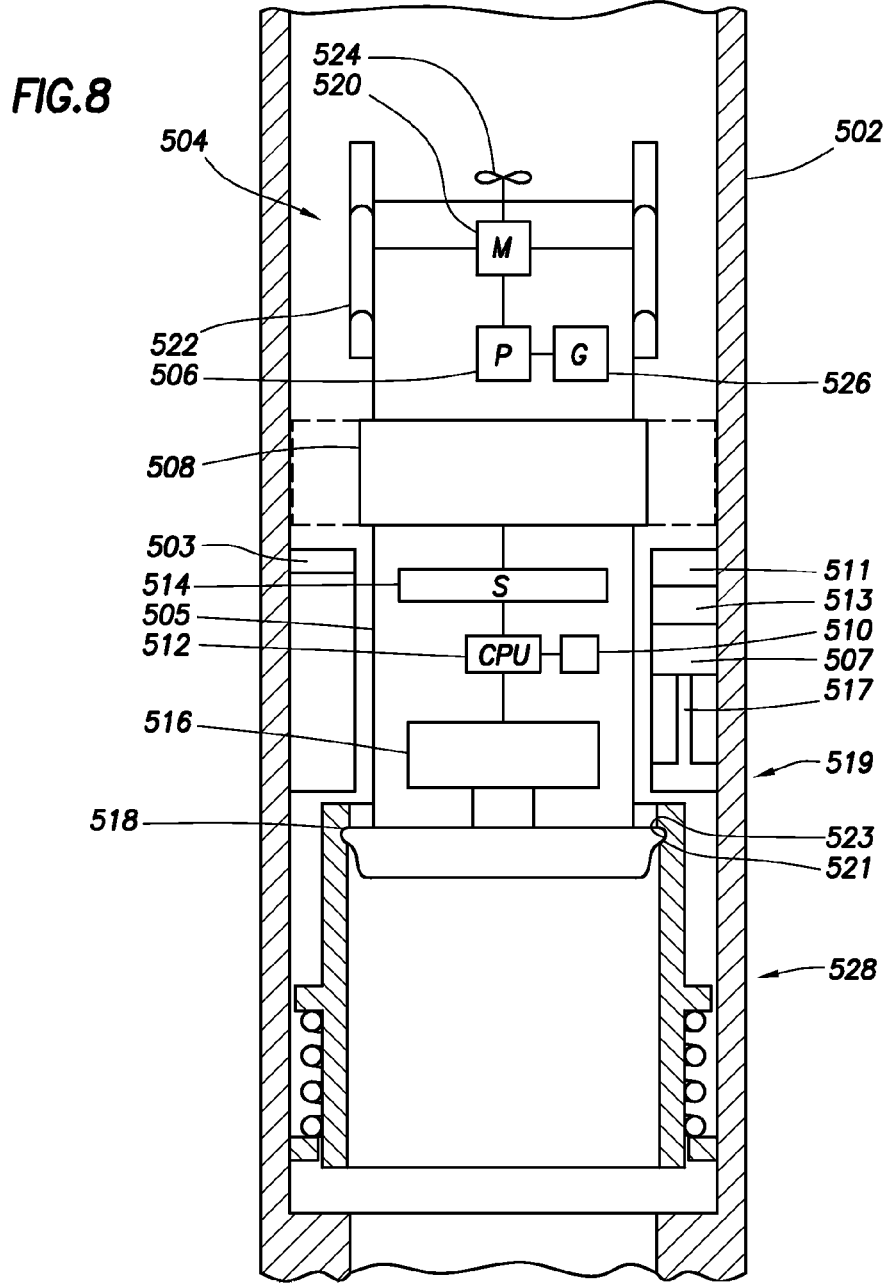

METHOD AND APPARATUS FOR REMOTELY CONTROLLING DOWNHOLE TOOLS USING UNTETHERED MOBILE DEVICES

CROSS-REFERENCE TO RELATED APPLICATIONS

None.

FIELD OF INVENTION

The invention relates to apparatus and methods for remote operation of downhole tools by maneuvering a mobile device in the wellbore.

SUMMARY OF THE INVENTION

Methods and apparatus are presented for remote operation of one or more downhole tools positioned in a subterranean wellbore extending from the surface and through at least one hydrocarbon-bearing zone. In an exemplary embodiment, the method comprises maneuvering a first mobile device (or "ball") from the surface into proximity with a downhole tool positioned in the wellbore. An electrical signal is transferred between the maneuvered first mobile device and the downhole tool. Then the first mobile device is removed from proximity with the downhole tool. A second mobile device is then maneuvered from the surface into proximity with the downhole tool and data is transferred between the downhole tool and the second mobile device.

The method and mobile devices have various alternative embodiments including wherein the maneuvered balls and the downhole tool come into physical contact, wherein the electrical signal contains digital data, wherein the electrical signal contains power, wherein the second mobile device is removed to the surface, dissolving one or more of the mobile devices, etc. A third mobile device can also be maneuvered from the surface into contact with the downhole tool and data transferred between the third mobile device and the downhole tool.

A production or other well test can be run in the wellbore between ball drops (or device insertions). For example, the downhole tool can be powered by the first (or later) mobile device, the tool then used to measure or store test data. The measured data is then transferred to a later inserted mobile device. Similarly, a mobile data device can transfer commands or data to the downhole tool, such as an activation command for the tool to actuate. The tool can include openable port assemblies, sliding sleeves, rupture disks, etc., or can be operably attached to run such devices. The method can be used to control an ICD valve controller which, in turn, controls various ICD valves.

Electrical power and/or data can be transferred between the downhole tool and/or mobile device(s). Powering can include traditional transfer of electrical power via contacts, cooperating inductive coils, etc. Alternately, the step of powering the downhole tool utilizing the maneuvered first mobile device may comprise utilizing the first mobile device to alter fluid flow through the downhole tool, wherein the fluid flow through the downhole tool is altered to actuate a power charger, such as a turbine.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2 is a schematic of a well system having an untethered mobile device for operating a downhole device according to one aspect of the invention;

FIG. 3 is a side view in partial cross-section of a mobile device proximate to and seated on a downhole tool in accordance with an embodiment of the invention;

FIG. 7A is a side view of a first mobile device proximate to and seated on a first seat of a downhole tool according to an embodiment of the invention;

FIG. 7B is a side view of a second mobile device proximate to and seated on a second seat of a downhole tool according to an embodiment of the invention;

FIG. 7C is a side view of a third mobile device for use with the downhole tool of FIGS. 7A-B;

FIG. 8 is an elevational view in partial cross-section of a mobile device positioned adjacent a downhole tool according to an aspect of the invention;

It should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. Where this is not the case and a term is being used to indicate a required orientation, the Specification will state or make such clear. "Uphole," "downhole" are used to indicate location or direction in relation to the surface, where uphole indicates relative position or movement towards the surface along the wellbore and downhole indicates relative position or movement further away from the surface along the wellbore, regardless of the wellbore orientation.

DETAILED DESCRIPTION OF PREFERRED EMBODIMENTS

While the making and using of various embodiments of the present invention are discussed in detail below, a practitioner of the art will appreciate that the present invention provides applicable inventive concepts which can be embodied in a variety of specific contexts. The specific embodiments discussed herein are illustrative of specific ways to make and use the invention and do not limit the scope of the present invention.

Figure 1:
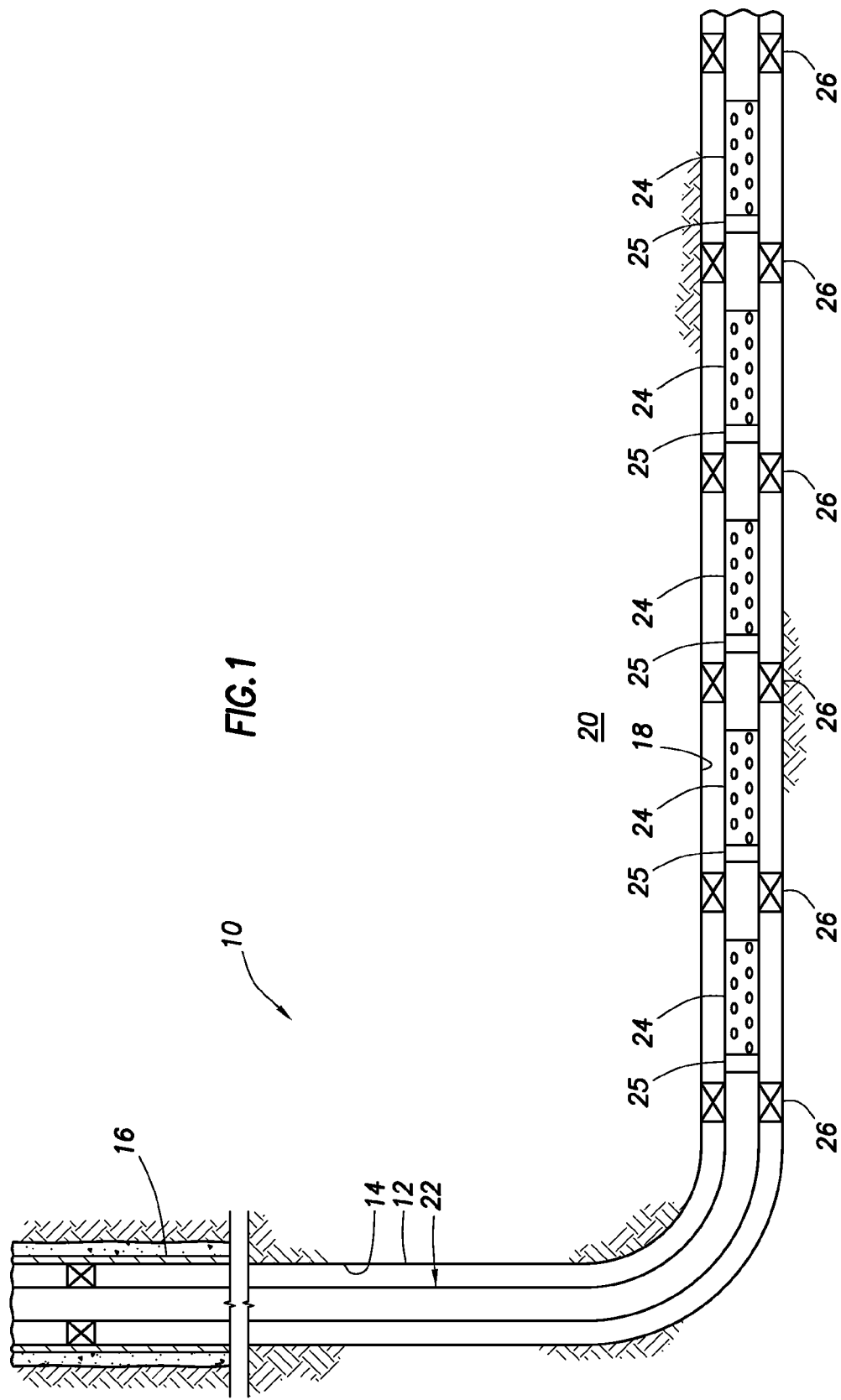
FIG. 1 is a schematic illustration of a well system including a plurality of autonomous fluid flow control systems according to an embodiment of the invention.

FIG. 1 is a schematic illustration of a well system, indicated generally 10, including a plurality of downhole tools, which are positioned at various downhole locations along the wellbore 12. A wellbore 12 extends through various earth strata. Wellbore 12 has a substantially vertical section 14, the upper portion of which has installed therein a casing string 16. Wellbore 12 also has a substantially deviated section 18, shown as horizontal, which extends through a hydrocarbon-bearing subterranean formation 20. As illustrated, substantially horizontal section 18 of wellbore 12 is open hole. While shown here in an open hole, horizontal section of a wellbore, the invention will work in any orientation, and in open or cased hole.

Positioned within wellbore 12 and extending from the surface is a tubing string 22. Tubing string 22 provides a conduit for fluids to travel from formation 20 upstream to the surface. Positioned within tubing string 22 in the various production intervals adjacent to formation 20 are a plurality of Inflow Control Devices (ICD) 25 and a plurality of production tubing sections 24. At either end of each production tubing section 24 is a packer 26 that provides a fluid seal between tubing string 22 and the wall of wellbore 12. The space in-between each pair of adjacent packers 26 defines a production interval.

In the illustrated embodiment, each of the production tubing sections 24 includes sand control capability. Sand control screen elements or filter media associated with production tubing sections 24 are designed to allow fluids to flow therethrough but prevent particulate matter of sufficient size from flowing therethrough.

The fluid flowing into the production tubing section typically comprises more than one fluid component. Typical components are natural gas, oil, water, steam, or carbon dioxide. Steam and carbon dioxide are commonly used as injection fluids to drive the hydrocarbon towards the production tubular, whereas natural gas, oil and water are typically found in situ in the formation.

The tubing string 22 shown is exemplary in nature. The inventions discussed herein may be used with production, work-over, drilling, completion and other tubing strings. Further, the inventions discussed herein can be used in conjunction with any downhole tubular, including casing, tubing, tubing strings, fluid flow passages, etc.

The downhole tools or operable tools 25 illustrated are exemplary. Although much of the discussion herein is focused on operation of ICDs through a downhole ICD controller installed in a production well, that is, operation of valves to shut-off, open or bypass ICDs, the invention can be used to operate many downhole tools. For example, the inventions can be used to operate sliding sleeves, valves, annular isolation devices, rupture discs, sand face monitoring tools, fluid analysis devices, actuators, electric motors, charges, etc.

FIG. 2 is a schematic of an embodiment of the invention using a mobile device in a downhole tubular extending through a wellbore. An exemplary tubular, such as the portion of a production string 30 as shown, extends through a wellbore. A plurality of downhole tools, including downhole tool 32 and downhole tools 36a-c, are positioned in the wellbore. For ease of discussion, this embodiment will be explained with reference to the downhole tool 32 as an ICD controller and the plurality of downhole tools it controls, namely, ICD valves 36a-c. It is to be understood, however, that the methods discussed can be applied to different downhole tools for which it is desirable to charge, transfer data to and from, and otherwise operate or actuate.

The ICD controller downhole tool 32 is connected by communication means 34 to selectively operate one or more operable tools 36, such as ICD valves 36a-c. The communication means can be electrical, fiber optic, wireless, or other means known in the art. The downhole tool 32 has a first seat 38 having a profile, such as a circumferential ledge, of a size to allow the mobile device 40 to contact the seat 38 but not pass through the downhole tool 32.

A first untethered, mobile device 100, shown as a "ball" in the exemplary embodiment, for maneuvering within the wellbore is shown positioned adjacent the ICD controller 32 and positioned on a seat 38 associated with the controller 32. In a preferred embodiment, the "balls" referred to herein are substantially spherical, as shown. However, the term "ball" is not used herein to require substantial spherical structure. Other shapes and arrangements will be understood by those of skill in the art and some will be explained herein, including but not limited to plugs, wipers, darts, tubes, and tags. First ball 100 includes means for transferring electrical power 102 to a downhole tool. For example, the means for transferring electrical power can be a plurality of electrical contacts 104, as shown. Alternate means for transferring power can be used, such as inductive couplers, magnetic couplers, electromagnetic radiation, piezoelectric couplers, magnetostrictive couplers, as are known in the art. For example, a pair of corresponding coils, one in the mobile device and one in the downhole tool, can be used to transfer an electric charge by varying the magnetic flux through the coils. In a preferred embodiment the first ball 100 also includes a means for storing power 106, such as a battery or other storage devices known in the art.

In use, the first ball 100 is maneuvered down the wellbore, for example through the interior of the production string, and into contact with the downhole tool 32. Preferably, the ball 100 is "flowed down" to the downhole location. Alternately, the ball 100 can be maneuvered downhole using a means for moving the mobile device 108, such as a propeller, tractor, wheels, and other moving means as known in the art. Once in location adjacent the ICD controller 32, the first ball 100 transfers power to, or "charges," the ICD controller. The first ball 100 is then removed from contact with the ICD controller. For example, the ball 100 can be dissolved in whole or in part or maneuvered to the surface, such as by "flowing up" to the surface or by use of means for moving built in to the ball.

FIG. 3 is a detail side view of a first ball 100 seated on an ICD controller 32 according to an embodiment of the invention. The ball 100 has means for transferring power 102, typically electrical power, in this example a plurality of electrical contacts 104. The ICD controller 32 has corresponding means for receiving power 40, in this example a corresponding set of electrical contacts 42. Note that the corresponding sets of means for transferring power may also be used as means for transferring data 110 between the first ball and the ICD controller as well. The means for transferring data can also be a separate connection between the ball and the downhole tool, electrical connection, fiber optic, wireless communication, etc. The ball 100 also includes means for storing power 106, preferably a battery. Power from the means for storing power is transferred to the ICD controller. The first ball can also include means for storing data 109 and means for transferring data 110, although in a preferred embodiment these are not necessary. Where data is to be transferred, the downhole tool has a corresponding means for transferring data 42 and means for storing data 44.

In an exemplary embodiment, after the first ball 100 is removed from contact with the seat 38, the well is brought into production and PLT data (Production Logging Tool) and is collected and stored at the ICD controller, such as in digital data storage electronics 44, which can have an associated CPU, etc. The data storage and collection can occur elsewhere, obviously, such as at a different downhole tool. In such a case, as those of skill in the art will understand, modifications will be necessary to the method described herein. The power transferred from the first ball to the ICD controller is utilized to collect and store the PLT data. Other types of data can be collected and stored; PLT data is merely an example.

Figure 4:
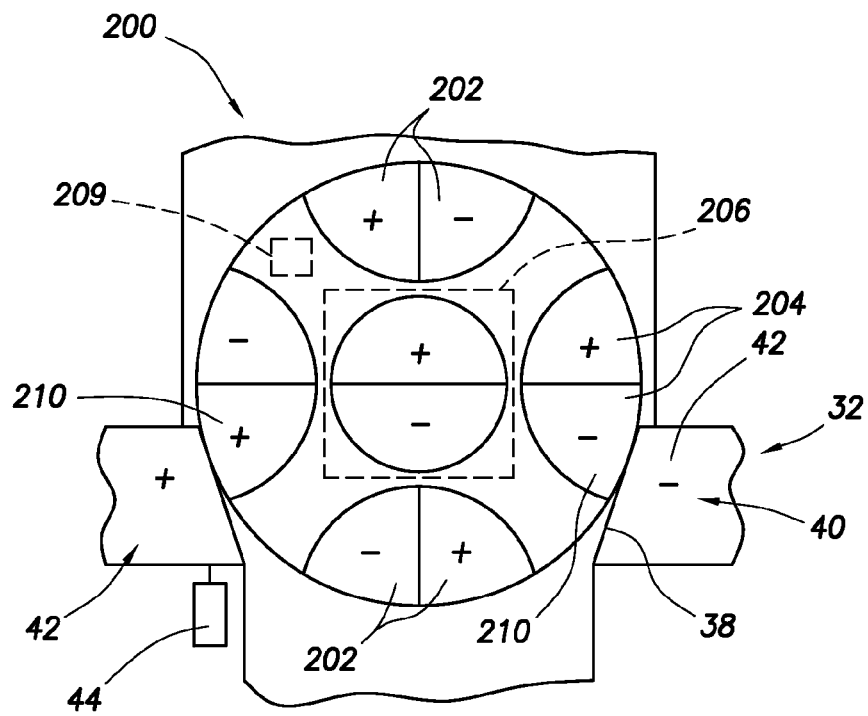
FIG. 4 is a side view in partial cross-section of a second mobile device proximate to and seated on a downhole tool in accordance with an embodiment of the invention.

FIG. 4 is a detail side view of a second mobile device 200 seated on downhole tool 32 according to an embodiment of the invention. The second mobile device 200 has means for transferring power 202, typically electrical power, in this example a plurality of electrical contacts 204. The ICD controller 32 has corresponding means for receiving power 40, in this example a corresponding set of electrical contacts 42. The ball 200 also includes means for storing power 206, preferably a battery. Power from the means for storing power is transferred to the ICD controller. Second mobile device 200 also includes a digital means for storing data 209, which can have an associated CPU, etc., and a means for transferring data 210 to and/or from the downhole tool 32. The downhole tool has corresponding means for transferring data 42. Note that the corresponding sets of means for transferring power may also be used as means for transferring data between the second mobile device and the ICD controller.

In use, the second mobile device or ball 200 is maneuvered down the wellbore and into contact with the downhole tool 32 (or other downhole tool) having the stored data. The second ball 200 powers the ICD controller, just as the first ball, and also transfers the stored data from the data storage means 44 of the ICD controller 32 to the second ball 200. The second ball 200 is then maneuvered to the surface for retrieval, such as by flowing the ball up, or using a means for moving on the second ball.

Figure 5:
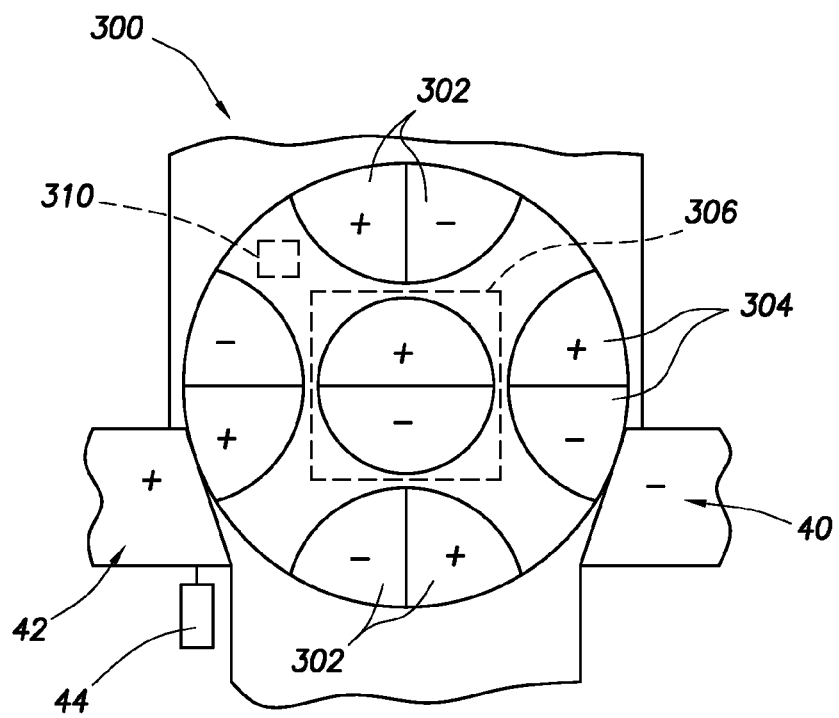
FIG. 5 is a side view in partial cross-section of a third mobile device proximate to and seated on a downhole tool in accordance with an embodiment of the invention.

FIG. 5 is a detail side view of a third mobile device 300 seated on downhole tool 32 according to an embodiment of the invention. The third mobile device 300 has means for transferring power 302, typically electrical power, in this example a plurality of electrical contacts 304. The ICD controller 32 has corresponding means for receiving power 40, in this example a corresponding set of electrical contacts 42. The ball 300 also includes means for storing power 306, preferably a battery. Power from the means for storing power is transferred to the ICD controller. Third mobile device 300 also includes a means for storing digital data 309, which may have an associated CPU, etc., and a means for transferring data 310 to and/or from the downhole tool 32. The downhole tool has corresponding means for transferring data 42. Note that the corresponding sets of means for transferring power may also be used as means for transferring data between the third ball and the ICD controller.

In use, the third mobile device or ball 300 is programmed with data at the surface, then maneuvered downhole into contact with the downhole tool 32. The third ball 300 can be used to re-charge the downhole tool 32. The third ball 300 transfers data to the ICD controller 32, such as instructions as to which of the ICD valves 36a-c are to be closed, opened, bypassed or otherwise operated. The third ball 300 is then removed from contact with the downhole tool 32.

Figure 6:
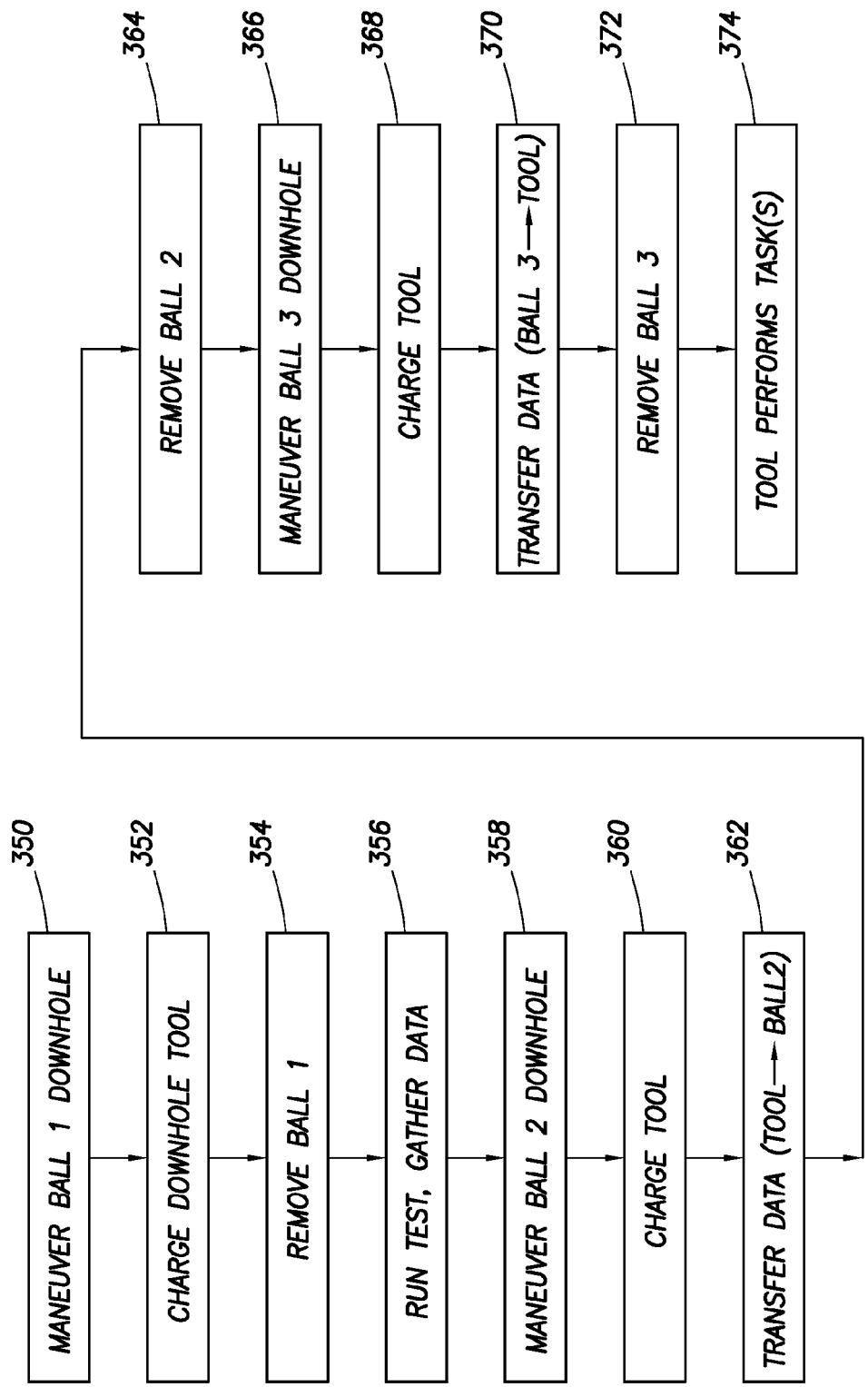
FIG. 6 is a schematic of a preferred method of the invention.

FIG. 6 is a flow chart of a preferred method according to an embodiment of the invention. At step 350, a first untethered, mobile device, such as ball 100, is maneuvered downhole and into contact with a downhole tool 32, such as an ICD controller. The mobile devices discussed herein can be maneuvered by dropping them in the wellbore, flowing them downhole or utilizing a means for moving attached to the mobile device. At step 352, the downhole tool is powered or charged utilizing the first mobile device. At step 354, the first mobile device is removed from contact with the downhole tool, such as by dissolving or maneuvering the first mobile device uphole. At step 356, a test or some other procedure is performed in the wellbore, such as a PLT test for example, and data is gathered and stored in a data storage means downhole, preferably at the downhole tool. At step 358, a second mobile device is maneuvered downhole and into contact with the downhole tool having the data stored therein. At step 360, the downhole tool is powered or charged utilizing the second mobile device. At step 362, data is transferred between the second mobile device and the downhole tool. For example, the stored data from the downhole tool is transferred to the second mobile device. At step 364, the second mobile device is removed from contact with the downhole tool and the data is transferred to the surface. For example, the second mobile device is maneuvered to the surface, such as by flowing up or utilizing a means for moving on the second mobile device. At step 366, a third mobile device is maneuvered into contact with the downhole tool. At step 368, the downhole tool is charged utilizing the third ball. At step 370, data is transferred between the third mobile device and the downhole tool. For example, data instructing the ICD controller which ICD valves to open, close or otherwise operate, and at what times, can be transferred from programmed data on the third mobile device to the ICD controller. At step 372, the third mobile device is removed from contact with the downhole tool. At step 374, the downhole tool performs one or more tasks. For example, the downhole ICD controller operates the downhole ICD valves.

Note that not all of the steps listed must be performed to practice the invention, which is limited only by the claims appended hereto. For example, depending on the type of downhole tool used, it may not be necessary to charge or re-charge the downhole tool with each sequential ball drop. Further, it will be apparent to those of skill in the art that some of the steps can be combined or skipped. For example, a single mobile device can be used to both collect data from the downhole tool and to transmit instructional data to the downhole tool. The mobile device can be programmed with "if-then" data, such that once the test (or other) data is collected from the downhole tool, it can be compared to the potential instructional data and the mobile device can supply instructional data in response based on the results of the test. Moreover, additional steps can be added without departing from the spirit of the invention. For example, additional procedures can be performed in the wellbore between the various steps. That is, for example, additional work-over, testing can be run, or strings inserted and removed, etc., such as between the steps of removing a ball and maneuvering the next ball into place. For example, the balls could seat in different locations, such as in a lateral or at different zones. Each of these different locations would have a unique address. Thus, the communication between the ball and the downhole tool could be specific to each different location. Multiple balls could be simultaneous placed in the well, each with different instructions to the different locations or each collecting location-coded data from the different locations.

The steps involving powering or charging the downhole tool utilizing a mobile device can be accomplished in multiple manners. The transfer of electrical power from a battery through electrical contacts has been discussed. Additional methods are discussed elsewhere herein and means for transferring power will be understood by those of skill in the art.

FIG. 7A is a schematic of a downhole tool and mobile device according to an embodiment of the invention. A portion of a downhole tubular 400 is shown having a downhole tool 402. The downhole tool 402 includes a first seat 404 for receiving a first mobile device or ball 406. A trap 408 is provided for limiting motion of the first (or other) mobile device 406. The trap 408 is shown as a collet trap but can take other forms as those of skill in the art will recognize.

The downhole tool 402 has a means for powering 410 the downhole tool. The means for powering the downhole tool is shown as a downhole turbine assembly 412 having a turbine 414 with magnets 416 provided for polarity and vanes 418 or other devices for rotating the turbine in response to fluid flow past the turbine. The turbine 414 is mounted for rotation in a fluid passageway 420 having rupture disks 422 and 424 at each end. In a preferred embodiment, the passageway 420 is filled with a clean fluid 426 prior to rupturing of the disks. The turbine assembly 412 also includes a copper wire coil 428, or equivalent, surrounding the turbine 414 for generating electrical power in response to turbine movement. Power is stored in the means for storing power 430, to which the coil is operably connected. The workings of a turbine will be understood by those of skill in the art, can have the magnets on the rotor or the stator, and will not be explained in detail herein.

The downhole tool 402 also includes a means for storing digital data 432, and can have an associated CPU, etc., and a means for transferring data 434, such as electrical contacts 436 at the first seat 404 and/or the second seat 438. The device may include means for transferring power as well. Diodes may be included to rectify the polarity of the electrical contacts 436 in case the ball lands with a different polarity than the downhole tool 402 was anticipating.

Seen in FIGS. 7B-C are two additional mobile devices, a second mobile device 440 and a third mobile device 442, both show as drop balls. As explained above, the mobile devices may have means for moving if desired, but in a preferred embodiment are simply dropped and moved by gravity or fluid flow within the wellbore. The second mobile device 440 has means for transferring data 444, shown as electrical contacts 446, corresponding to the electrical contacts of the downhole tool. The second ball 440 also has a means for storing data 448, such as a CPU, etc. The third ball 442 similarly has a means for transferring data 450 and means for storing data 452. The mobile devices can include means for transferring power and means for storing power as well.

In use, the first mobile device or ball 406 is maneuvered into contact with the first seat 404 of the downhole tool. The ball 406 passes through the collet trap 408 but is prevented from moving uphole by the collet trap. The first ball 406 plugs the primary passageway 454 of the downhole tool. The first ball is utilized to power the downhole tool. Fluid is pumped downhole and differential pressure builds across the first ball until rupture disks 422 and 424 are ruptured. Those of skill in the art will recognize that equivalent devices to rupture disks can be used, such as sliding sleeves or movable valve members held with shear pins, shear screws, shear rings, springs, or the like. Other selectively openable valves can be used as is known in the art.

The turbine 414 is then operated by flowing fluid through the passageway 420. The fluid can flow either direction through the passageway to turn the turbine. In a preferred embodiment, the well is put on production and fluid is forced through the passageway 420 to power the turbine. In such a case, the first ball 406 moves upward into contact with the lower end of the collet trap when fluid is flowing uphole, as when the well is producing. The first ball 406 plugs or restricts fluid flow through the primary passageway 454 at or below the collet trap. As the fluid flows through the passageway 420 and operates the turbine assembly, electrical power is created in the coil 428 by the rotating magnets 416 and stored in the means for storing power 430.

In a preferred embodiment, the downhole tool 402 includes means for collecting data 456, such as PLT data during testing. The means for generating power and means for storing power can be used to power the means for collecting data. The means for collecting data 456 can include pressure sensors, temperature sensors, fluid flow sensors, and other sensors known in the art. Data is stored in the means for storing data 432. Such testing can be run while the first ball is in the primary passageway or after it is removed.

The first ball 406 is then removed from contact with the downhole tool. As explained above, the ball can be dissolved, flowed out of the wellbore, or moved by a means for moving attached to the ball. For example, the ball can be made of anhydrous boron and dissolved as is known in the art. Where a collet trap or similar is used, the ball is dissolved or the collet trap must be retracted.

The second mobile device 440, or data ball, is then maneuvered downhole and into contact with the downhole tool. The second ball 440 is of a smaller effective diameter than the first ball in a preferred embodiment. The second ball 440 is seated on second seat 438. Means for transferring data 444 on the second ball, such as electrical contacts, is effectively connected to means for transferring data 434 of the downhole tool, such as corresponding electrical contacts 436. Data is transferred from the means for storing data 432, including testing data, to a means for storing data 448 in the second ball. Power may also be transferred between the second ball and the downhole tool if desired. The second mobile device is then removed from contact with the downhole tool. The second ball is maneuvered to the surface, such as by flowing up, by means for moving positioned in the second ball, etc. Data, such as testing data, is then collected from the second ball at the surface. The second ball is sized to pass through the collet trap moving in either direction.

The third mobile device or ball 442 is then maneuvered into contact with the downhole tool. In one embodiment, the third ball is seated on the first, larger effective diameter, seat 404. Means for transferring data 450 on the third ball, such as electrical contacts, is effectively connected to means for transferring data 434 of the downhole tool, such as corresponding electrical contacts 436. Data is transferred from the means for storing data 452 of the third ball, including instructional data, to the means for storing data 432 of the downhole tool. Power may also be transferred between the third ball and the downhole tool if desired.

Alternately, the third ball can be of a diameter to seat on the relatively smaller seat 438. Because of the size difference, smaller contacts can be used on the third ball for seating on the smaller seat. Or the third ball can be of a diameter to pass through the collet trap but still seat on the larger diameter seat 404.

The instructional data transferred to the downhole tool is then utilized by the downhole tool to perform one or more tasks. For example, the downhole tool can be an ICD controller, as explained above, and send control signals to a plurality of ICD valves, opening, closing or otherwise operating the valves to control production in the wellbore.

The third mobile device can remain in the wellbore or be removed from contact with the downhole tool, such as by removing to the surface or by other method, as explained elsewhere herein. If the ball is left in the primary passageway, it may move upward to the collet trap during production. Production fluid can be flowed through the primary passageway or turbine passageway as desired. Alternately, the third ball can be dissolved.

The second and third balls 440 and 442 are seen in FIGS. 7B-C as the same diameter. As explained, they may be of different diameters. Additionally, one or both of the second and third balls can have motive means, means for storing charge, recharging, data transfer and storage, etc., as explained above with respect to FIGS. 3-5. An explanation will not be repeated here.

Similarly, the method of use for the two or three ball version with differing diameters and use of turbine (or similar) is explained above and can be utilized with variations as described in relation to FIG. 6.

FIG. 8 is a schematic of an untethered, mobile device 500 shown positioned in a wellbore tubular 502 according to an embodiment of the invention. The mobile device 500 is untethered, that is, not connected to the surface by or lowered into the wellbore on a wireline, cable, workstring, communications line, etc. The mobile device is independent of any such connection and freely moves within the wellbore along any tubular previously positioned in the wellbore, such as a casing, tubing, workstring, production string, etc.

Turning again to FIG. 1, the untethered, mobile device of this embodiment is inserted into the wellbore at the surface and run downhole to operate, actuate and/or communicate with downhole tools already in position downhole in the wellbore. The wellbore is shown as having casing at the upper portion and being uncased (open hole) in a lower portion. The mobile device can be run in any downhole tubular 502 including casing, a production or work string, etc. Generally herein, such movement is referred to as within the wellbore regardless of whether and which type of downhole tubular the mobile device is motive within. The downhole tools 25 operable by the mobile device can be a flow restrictor including but not limited to ICD valves, packers, sliding sleeves, Autonomous ICDs, etc.

The mobile device 500 is shown positioned in a downhole tubular 502 adjacent a downhole tool 501, here shown as a sliding sleeve valve. The mobile device 500, in a preferred embodiment, includes a housing 505 in which is positioned a motive assembly 504, a power supply 506, an anchoring assembly 508, a communication assembly 510, a computer assembly 512, one or more sensors 514, an actuator 516, a coupling assembly 518.

The downhole tool 501 can be any downhole tool, as explained above, and is described in an exemplary embodiment here as a sliding sleeve valve for opening and closing an ICD. The downhole tool 501 can includes an identification tag 503, a power supply 507, communication assembly 511, a computer assembly 513, an actuator 517, and a coupling assembly 519. It is understood that it is unlikely that all of these assemblies will be used in a single embodiment as they may be redundant of assemblies present in the mobile device, however, they are shown and discussed as optional embodiments.

The untethered, mobile device 501, in a preferred embodiment, includes a motive assembly 504 by which the mobile device moves independently within the wellbore. The motive assembly 504 can be any such known in the art. For example, the motive assembly 504 can include wheels or tractors 522 driven by a motor 520, shown schematically in FIG. 8. For an exemplary structure for a tractor assembly, see U.S. Pat. No. 6,273,189 to Gissler, et al., issued Aug. 14, 2001, which is incorporated herein by reference for all purposes. Alternately, the mobile device can have a propeller 524 driven by a motor 520, as shown schematically in FIG. 8. Normally only one motive assembly would be used. Other types of motive assemblies can be used as are known in the art, including a motor to pump out fluid from the device to provide thrust. For example, see U.S. Pat. Nos. 7,363,967 and 7,322,416, both of which are incorporated herein by reference for all purposes. Preferably the mobile device can move itself both up and downhole.

In one embodiment, the mobile device can be "flowed" up or down within the wellbore using techniques known in the art. That is, fluid can be pumped up or down the interior of the tubular in which the mobile device is positioned, thereby moving the device. For example, fluid can be pumped down an annular space about the tubular, then back up through the interior space, thereby moving the device up toward the surface. Further, the mobile device can be moved using gravity to pull the device downhole.

The power supply 506 is preferably a battery, capacitor or fuel cell. Alternately, other power supplies may be employed, including chemical and mechanical stored energy. Preferably the power supply is a primary battery such as a lithium cell. Alternatively, the power source is rechargeable and can be recharged downhole without returning to the surface. Charging, or recharging, of the power supply can be achieved by connection at a downhole location to a power source. For example, the mobile device can connect to an electrical line already positioned in the wellbore. Alternately, charging or recharging of the power supply 506 can be achieved by a power generator 526 either positioned in the mobile device, as shown, or positioned downhole in the wellbore and to which the mobile device can connect for transfer of electrical power.

The power supply 506 may be any energy storage device suitable for providing power to downhole tools. Examples of energy storage devices include a primary (i.e., non-rechargeable) battery such as a voltaic cell, a lithium battery, a molten salt battery, a heat engine such as a combustion engine, or a thermal reserve battery, a secondary (i.e., rechargeable) battery such as a molten salt battery, a solid-state battery, or a lithium-ion battery, a fuel cell such as a solid oxide fuel cell, a phosphoric acid fuel cell, an alkaline fuel cell, a proton exchange membrane fuel cell, or a molten carbonate fuel cell, a capacitor, and combinations thereof. The foregoing energy storage devices are well known in the art. Suitable batteries are disclosed in U.S. Pat. No. 6,672,382 (describes voltaic cells), U.S. Pat. Nos. 6,253,847, and 6,544,691 (describes thermal batteries and molten salt rechargeable batteries) and OTC paper 19621 which is available at the website: e-book.lib.sjtu.edu.cn (describes molten salt rechargeable batteries), each of which is incorporated by reference herein in its entirety for all purposes. Suitable fuel cells for use downhole are disclosed in U.S. Pat. Nos. 5,202,194 and 6,575,248, and 7,258,169, each of which is incorporated by reference herein in its entirety. Additional disclosure regarding the use of capacitors in wellbores can be found in U.S. Pat. Nos. 6,098,020 and 6,426,917, each of which is incorporated by reference herein in its entirety for all purposes. Additional disclosure regarding the use of combustion engines in wellbores can be found in U.S. Pat. No. 6,705,085, which is incorporated by reference herein in its entirety for all purposes. Additional disclosure regarding the use of mechanical energy storage, differential pressure, and hydrostatic chambers can be found in U.S. Pat. No. 7,699,102 to Fripp, which is incorporated by reference herein in its entirety for all purposes.

Further, the power supply can be rechargeable by use of a vibration based power generator. Disclosure regarding such is found at U.S. Pat. No. 7,199,480, to Fripp, which is incorporated by reference herein in its entirety for all purposes. Additional disclosure regarding the use of piezoelectric based power generators can be found in U.S. Pat. App. Pub. No. 2010/0219646, which is incorporated by reference herein in its entirety for all purposes. Additional disclosure regarding the use of thermo-mechanical electrical power generation can be found in U.S. Pat. No. 4,805,407, which is incorporated by reference herein in its entirety for all purposes.

The power supply 506 can provide power to different electrical loads in the device 500. For example, the different electrical loads can include the motor 520, the plurality of sensors 514, the anchoring assembly 508, the computer assembly 512, the coupling assembly 518, etc. Further, the power supply can be connected to a downhole tool and used to actuate the tool.

The mobile device 500 can include an anchoring assembly 508. The anchoring assembly can be used to anchor the mobile device in the wellbore, such as to the interior surface of the downhole tubular 502, to the downhole tool 501 itself, or a pair of anchoring assemblies can be used to anchor the device to both the tubular and tool. An exemplary anchoring assembly is shown in schematic FIG. 8 with dashed lines indicating a set or anchored position and solid lines indicating a retracted or un-set position. Anchoring assembly 508 can be of any type known in the art, such as slips, setting tools, collet mechanisms, spring loaded mechanisms, magnetic latches, etc.

Additional disclosure regarding anchoring assemblies and their use can be found in U.S. Pat. App. Pub. No. 2011/0073326 to Clemens, which is incorporated by reference herein in its entirety for all purposes. Additional disclosure regarding anchoring assemblies and their use can be found in U.S. Pat. No. 5,207,274 to Streich, which is incorporated by reference herein in its entirety for all purposes.

The anchoring assembly can be powered by the power supply 506 as described above or can alternately be powered by a separate power supply, power generator or the like. The anchoring assembly can include a profile for cooperating with a known profile along the wellbore tubular such that the mobile device maintains its position in relation to the tubular. Further, the anchoring assembly can expand radially to engage the tubular inner surface, as is known in the art.

Alternately, the motive assembly can be used as an anchoring assembly. For example, the tractors or wheels 522 can be braked or locked to provide an anchor against the tubular interior surface.

The communication assembly 510 can include transmitters and receivers as are known in the art. The components of the communication assembly are operably connected to the computer assembly so that communications sent from the surface can be routed to the computer assembly downhole and vice versa. The user can then send wireless signals to the mobile unit to perform functions, query data, perform operations, change pre-programmed instructions, etc. The computer assembly can operate the transmitter to send signals at set times, upon one or more set conditions, upon beginning or completing a task or operation, etc. Alternately, the mobile device can have a communications connection assembly for "plugging into" a hard-wired communication port at a downhole location. For example, it is known to position communication lines, wires, fiber optics, etc., in a wellbore from the surface to downhole locations. The mobile device can locate such a port, plug in and communicate with the surface.

The computer assembly 512 can include, but not by way of limitation, one or more processors including but not limited to PIC processors and CPUs, memory storage devices, batteries, transmitters, receivers, electrical connections, etc. The term "computer assembly" is used in a broad sense herein to include any combination of processor and memory storage device. The computer assembly can be operably connected to control the motive assembly 504, the anchoring assembly 508, to read and operate the plurality of sensors 514, to operate the actuator 516, to communicate with the surface by way of transmitter and receiver units, etc. The computer assembly will not be described herein in detail as such are well known in the art.

The computer is pre-programmed to control the mobile device in the wellbore. For example, the computer can be programmed to turn on the motive assembly after expiration of a time period, at a certain time, or based on other parameters, such as reaching a certain depth or location in the well, or when the sensors indicate a pre-programmed set of conditions, such as temperature, pressure, flow rate, etc. The computer assembly memory storage device preferably has preloaded data including the locations or various ID tags, which downhole tools they correspond to, etc. The computer can then operate the anchoring assembly as desired once a suitable location is reached. The computer assembly can operate the actuator upon set conditions, such as location, contact with the tool, environmental parameters, etc.

Further, the computer assembly can preferably be programmed to take a series of desired operations downhole upon receiving a signal, expiration of a time delay, or upon receiving predetermined signals from the sensors. For example, the mobile device can be undertake a series of operations when the plurality of sensors measures parameters indicating that the composition of the production fluid includes a selected amount of water. Once the predetermined parameters are reached, the mobile device then moves within the wellbore to a first location, for example, first ICD 26a, where it then actuates or operates the ICD valve. The mobile device then moves to a second downhole location, such as ICD valve 26c, and actuates or operates that valve. The mobile device can open, close, bypass, etc., the pre-selected downhole tools, such as the ICD valves. Further, the mobile device can then stay downhole until needed to perform further operations. The ICD valves can thus be opened, closed, etc., at various times upon various conditions or as selected.

The mobile device preferably includes one or more sensors 514 for sensing downhole conditions, parameters, identification tags, etc. For example, the sensors can include temperature, pressure, chemical, fluid flow rate, and fluid composition sensors, such as to determine the amount of oil, gas, and water in the fluid. The sensors can also include sensors to determine the location of the mobile device in the wellbore. For example, the sensors can transmit and receive coordinate information. The sensors can also include rotational counters, for example, to track the rotation of the motive assembly wheels, etc., to determine distance travelled.

Further, the sensors can include identification tag sensors. For example, identification tags, such as ID tag 503 can be positioned at various locations and on various downhole tools or along the tubular. The mobile device sensors would then read the ID tags, thus determining the location of the mobile device in the wellbore and/or its location adjacent a particular downhole tool. The ID tags 503 can be RFID tags, such as active, passive or low-frequency RFID tags, oil filled tags, pip tags, or radioactive tags. The ID tag sensors, obviously, would be sensors which read the corresponding tags.

The sensors are operably connected to supply information and data to the computer assembly. The sensors can be used for several different purposes. For example, sensors can be used to provide information or data related to the location of the mobile device in the wellbore. Such sensors can include gyroscopes, pressure and temperature sensors, sensors for sending and/or receiving location information from a database or wirelessly transmitted system. The ID tag sensors can also be used to indicate location as the location of the ID tags is known. At a minimum, such ID tags can be used to identify that the mobile device is adjacent the tool having the tag.

Alternately, the sensors can be used to identify known ID features, such as tool profiles, to indicate location. Disclosure of sensors and their use are found at U.S. Pat. Nos. 7,363,967 and 7,322,416, which are incorporated herein by reference for all purposes.

The sensors can also be used to measure environmental parameters downhole, such as temperature, pressure, flow rate, chemical composition of downhole fluids, physical composition of downhole fluids (oil, water, gas, selected chemical compositions, etc.), viscosity, density, etc. Again, these readings are sent to the computer assembly. The sensed measurements can be used to trigger operation of the mobile device. For example, the computer assembly can control the mobile device to close a given ICD valve upon the sensing of a particular combination of flow rate, fluid composition and elapsed time.

The mobile device preferably includes a downhole actuator for operating selected downhole tools. The actuator 516 can be any downhole actuator known in the art. For example, the actuator can include a DPU, an hydraulic actuator, a pressure differential actuator, an electrical actuator, an chemical actuator, a mechanical actuator, etc. The actuator can preferably be used reversibly and repeatedly. The actuator can be triggered by a control signal from the computer assembly. The actuator can be powered by the power supply 506 or by a separate power supply (mechanical, electrical, chemical, etc.) positioned on the mobile device. The actuator can be mechanical, moving a coupling assembly, a piston, a sliding sleeve, etc., or can be electrical, sending an electrical signal to operate a downhole tool such as an electrically activated rupture disk. The preferred actuator uses the energy from the pressure difference between an air chamber and the hydrostatic pressure in the wellbore. This concept is articulated in U.S. patent application Ser. Nos. 12/353,664 and 12/768,927.

The mobile device can also have a coupling assembly 518. The coupling assembly is used to connect the mobile assembly to a downhole tool so that the tool can be operated. For example, the tool 501 can have a profile 523 which corresponds to and cooperates with a profile 521 on the mobile device coupling assembly. The actuator assembly, when actuated, moves the coupling assembly 518, or a portion thereof, which in turn moves the corresponding portion of the downhole tool. For example, the actuator can move the coupling assembly 518 longitudinally, thereby sliding a sliding sleeve 528 of a valve assembly on the tool.

Alternately, the mobile device 500 can actuate the downhole tool 501 by movement of the device itself along the tubular. That is, the mobile device 501 can contact a portion or profile on the tool, and then the mobile device can move in the wellbore utilizing the motive assembly to thereby push, pull or otherwise move the corresponding portion of the tool. Preferably the tool is actuated by longitudinal movement, however other movements can be used, such as radial, torsional, etc.

Alternately, the coupling assemblies 518 and 519 can couple to one another inductively, electrically or magnetically, as is known in the art. For example, the device and/or tool can have a cooperating set of coils, magnets or both, such that, upon actuation, movement of the device (or a portion thereof, such as a sliding sleeve) produces corresponding motion in the tool (or a portion thereof, such as a corresponding sliding sleeve) or vice versa.

Persons of skill in the art will recognize that one or more of the functions performed during a task, for example, opening a sliding sleeve valve, can be performed by an assembly on the mobile device or by an assembly on the downhole tool. For example, the exemplary downhole tool is shown having an identification tag 503, a power supply 507, communication assembly 511, a computer assembly 513, an actuator 517, and a coupling assembly 519.

The actuator 517 can perform the step of actuating the downhole tool in one embodiment. In such a case it would be unnecessary for the mobile device to also have an actuator. In this arrangement, the mobile device could still transfer power to a power supply on the tool, communicate with the tool or trigger the tool actuator, etc., but the actuator for operating the tool is located downhole, on the tool for example, rather than on the mobile device. Similarly, the communications assembly, computer assembly, anchoring assembly, etc., of the downhole tool can be used to perform like functions to those described herein with reference to the assemblies and elements of the mobile device.

Figure 9:
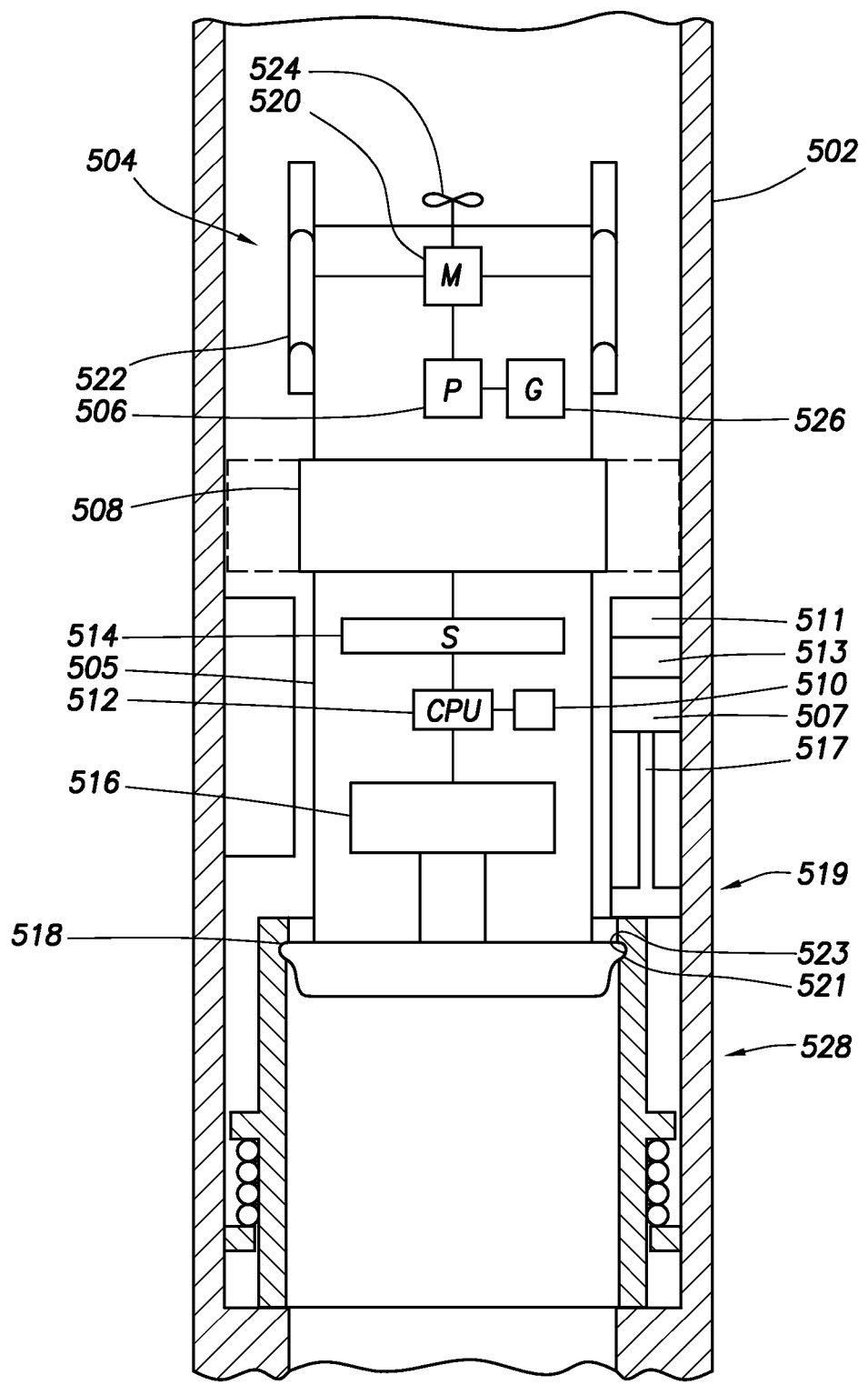
FIG. 9 is an elevational view in partial cross-section of the mobile device and downhole tool of FIG. 8 shown in an activated position.

FIGS. 8 and 9 show a schematic of an exemplary downhole tool 501, namely a sliding sleeve valve, positioned in a wellbore and operated by an exemplary mobile device 500; FIG. 8 shows the sliding sleeve valve in a closed position and FIG. 9 shows the sliding sleeve valve in an open position. The sliding sleeve valve can be part of an ICD valve, for example. The mobile device 500 is positioned in a wellbore tubular 502 adjacent a downhole tool 501. The device and tool are shown connected to one another by a device coupling assembly 518 including a mating profile 521 and a tool coupling assembly 519 including a cooperating tool profile 523. The motive assembly 504, the anchoring assembly 508, and actuator 516 are shown schematically.

In use, the mobile device 500 is programmed or receives signals to locate and operate the downhole tool 501 as described herein. The motive assembly is used to move the mobile device along the wellbore tubular to a position adjacent the tool. Alternately, it is possible to move the device using gravity or fluid flow. The coupling assemblies and mating profiles are engaged. The anchoring assembly, if present, is actuated, thereby anchoring the mobile device at a selected position adjacent the tool. Alternately, the mobile device need not anchor to the tubular wall, but merely engage the tool at a coupling assembly and either be held in place in the tubular by the motive assembly, such as by braking or locking mobile device wheels, or be moved along the tubular by the motive assembly, where the movement of the device acts to actuate the tool. Alternately, the actuator 516 can operate the tool. For example, the actuator 516 can be a DPU which acts to extend the coupling assembly 518, as seen in FIG. 10, thereby moving the sliding sleeve from a closed to an open position.

Further, the mobile device can transfer data and instructions to and from the tool computer assembly. For example, the device can download data collected and stored on the downhole tool for transmission or delivery to a user at the surface. The mobile device can also transfer data and instructions to the tool. For example, the mobile device can send a signal to the tool to actuate, provide programming data so the tool will actuate at a given time or upon a given set of conditions, etc.

Power can also be transferred between the mobile device and downhole tool. As explained elsewhere herein, the mobile device can charge or re-charge a power supply on the tool. Alternately, the tool can transfer power to the mobile device if, for example, the tool was provided with a power line to the surface or had an on-board power generator and the device needed to re-charge to perform additional functions.

Once the task was completed at the downhole tool—the transfer of data, signaling, actuating, etc., the mobile device would then uncouple from the tool. The mobile device can be used repeatedly at different locations along the wellbore, for example, to operate a series of ICD valves.

In another embodiment, the mobile device can be made of dissolvable material. The mobile device can then be removed from the wellbore by simply dissolving it in place. The following provides further disclosure regarding the use of dissolvable tools in downhole wellbores and is incorporated herein by reference for all purposes: U.S. Pat. No. 7,168,494 to Starr; and U.S. Pat. App. No. 2011/0247833 to Todd.

Figure 10A:
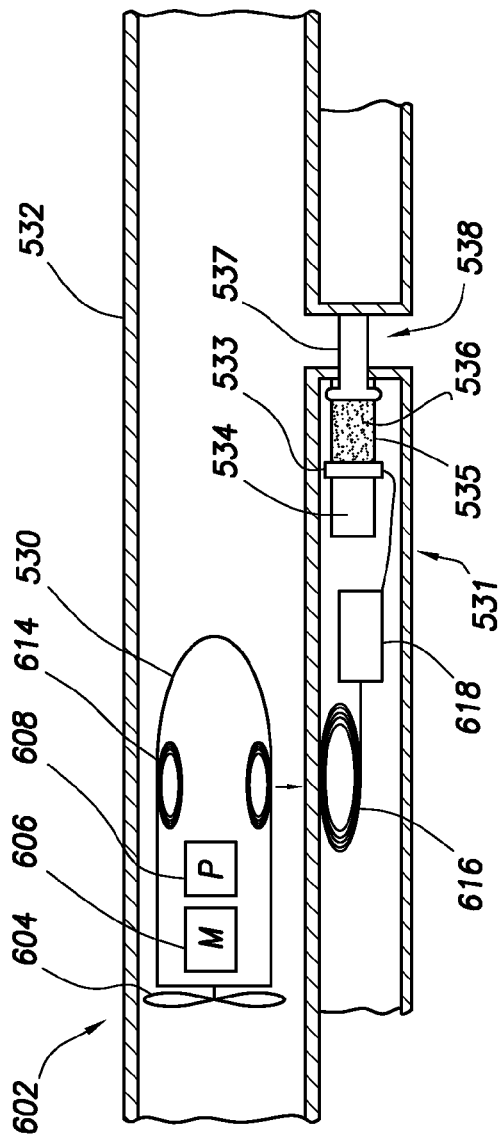
FIGS. 10A-B are side schematic views of a mobile device according to an embodiment of the invention adjacent a downhole tool seen in an initial position in FIG. 10A and an activated position in FIG. 10B.
Figure 10B:
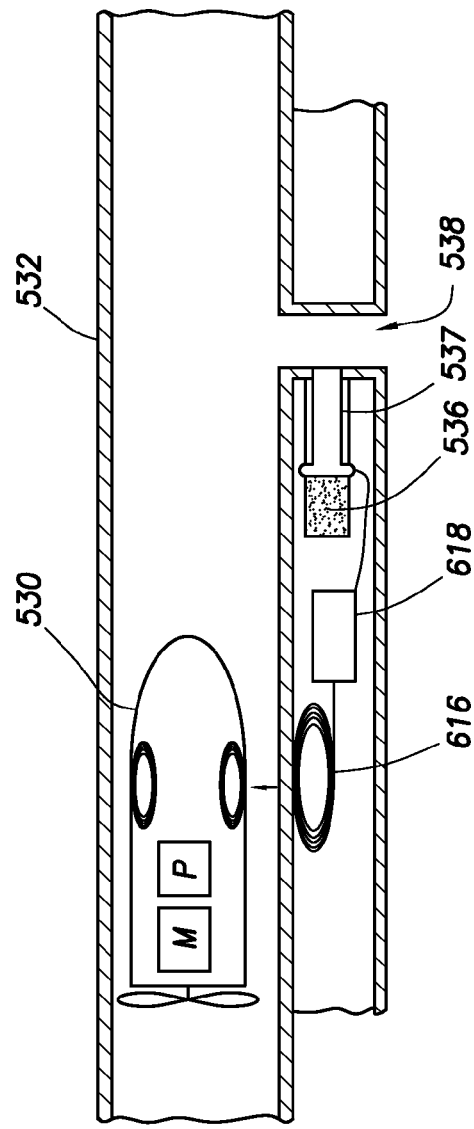

FIGS. 10A-B are schematic views of a downhole tool having a rupture disk and operable by a "torpedo" shaped mobile device according to an embodiment of the invention. Mobile device 530 is shown moved adjacent to downhole tool 531 in a wellbore tubular 532. The downhole tool 501 has a rupture disk 533 positioned between an atmospheric chamber 534 and a relatively higher pressure fluid chamber 535. When the rupture disk is ruptured or activated, as in FIG. 10B, the fluid 536 moves to fill the atmospheric chamber 534, thereby lowering the internal pressure in the fluid and allowing biased piston 537 to retract, thereby opening port 538.

In an exemplary embodiment, the rupture disk is for selectively blocking fluid flow through a bypass passageway around an ICD. Once the rupture disk is ruptured, production fluid flows through the bypass passageway.

Generally, the methods described in relation to FIGS. 1-9 can be employed using a device which is motivated by an internal motivation means, several of which are described above. Such a unit preferably does not need to anchor in the well. Such a device is shown in FIGS. 10A-B. The mobile device 530 includes a motive force generator 602 (such as a propeller 604 or otherwise as described elsewhere herein), a motor 606, and a power supply 608. Once maneuvered in the wellbore as shown, the device 530 maintains its position long enough to interact with the downhole tool assembly 531. In the preferred embodiment shown, the mobile device 530 includes inductive coils 614 (or similar) which interact with the corresponding inductive coils 616 on the tool.

The downhole tool, which preferably has a computer, data storage or other electronics assembly 618, receives and reads a specific command from the mobile device. Upon receiving the command, the downhole tool activates an electronic rupture disk 533 or other device. The electronic rupture disk 533 ruptures in response to an electronic signal or pulse, freeing fluid 537 in chamber 536 to expand or move into the air chamber 534. In response to the now lowered pressure acting thereon, the piston 537 (or similar) moves (retracts in this embodiment) to open port 538.

The mobile device can then be powered to another location to perform other tasks downhole. The mobile device can include the various aspects discussed above in relation to the "ball" embodiments, such as power supply, data storage, communication, a logic device (e.g., computer), etc.

Any rupture disks known in the art can be used in conjunction with the invention, including rupture disks which are ruptured mechanically, electronically, chemically, hydraulically, etc. The mobile device can also remotely rupture or trigger the rupture of the disk. For further disclosure on rupture disks, their use and operation, see the following references which are incorporated herein by reference for all purposes: U.S. Pat. No. 6,540,263 to Schwendemann; U.S. Pat. No. 6,397,950 to Streich; U.S. Pat. No. 5,341,883.

For disclosure regarding rupture disks and ICD valves, see the following which are hereby incorporated by reference for all purposes: U.S. Pat. No. 7,857,061 to Richards; and U.S. patent application Ser. No. 11/958,466 to Richards.

The methods explained above are exemplary only and those of skill in the art will recognize variations and additions which can be made using the apparatus and methods described herein. The method need not include all of the steps mentioned nor must they be performed in the order mentioned.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

It is claimed:

1. A method for remote operation of a downhole tool positioned in a subterranean wellbore extending from the surface and through at least one hydrocarbon-bearing zone, the method comprising the steps of:
   maneuvering an untethered, first mobile device from the surface through an interior passageway defined in a downhole tubular extending through the wellbore and on to a substantially annular first seat positioned in an interior passageway defined in a downhole tool positioned in the wellbore;
   transferring an electrical signal between the first mobile device and the downhole tool;
   powering the downhole tool utilizing the first mobile device, wherein the first mobile device substantially restricts fluid flow through the interior passageway, wherein the fluid flow is altered by the first mobile device to operate a power producing assembly operably connected to power the downhole tool;
   removing the first mobile device from the downhole tool;
   maneuvering an untethered, second mobile device from the surface through the interior passageway defined in the downhole tubular extending through the wellbore and on to a substantially annular second seat positioned in an interior passageway defined in the downhole tool;
   transferring an electrical signal between the downhole tool and the second mobile device;
   operating the downhole tool;
   operating one or more additional downhole tools positioned in the wellbore in response to a transfer of an electrical signal from the first or second mobile device to the downhole tool;
   removing the second mobile device from the second seat; and
   transferring data from the first or second mobile device at the surface.

2. The method as in claim 1, wherein the power producing assembly comprises a turbine positioned in a bypass flow conduit.

3. The method as in claim 2, further comprising the step of rupturing a rupture disk initially blocking fluid flow through the bypass flow conduit.

* * * * *